United States Patent [19]

Ishiwata

[11] Patent Number: 5,433,498
[45] Date of Patent: Jul. 18, 1995

[54] TRIM CONNECTING STRUCTURE

[75] Inventor: Masayuki Ishiwata, Hamamatsu, Japan

[73] Assignee: Suzuki Motor Corporation, Hamamatsu, Japan

[21] Appl. No.: 165,961

[22] Filed: Dec. 1, 1993

[30] Foreign Application Priority Data

Apr. 16, 1993 [JP] Japan .................. 5-089657

[51] Int. Cl.6 .............................. B60R 13/02
[52] U.S. Cl. .................... 296/39.1; 52/511;
52/716.5; 24/625
[58] Field of Search ............. 296/39.1, 146.7;
52/511, 716.3, 716.5–716.7; 24/297, 625

[56] References Cited

U.S. PATENT DOCUMENTS 3,115,225  12/1963  Fraylick et al. ............... 52/716.7
3,249,973   5/1966  Seckerson ..................... 24/297 X
3,771,275  11/1973  Seckerson ..................... 52/511 X
4,728,143   3/1988  Tanino et al. ................ 296/146.7 X
4,756,060   7/1988  Ojima .......................... 24/20 CW
5,186,517   2/1993  Gilmore et al. ............... 52/511 X Primary Examiner—Dennis H. Pedder
Attorney, Agent, or Firm—Arnold, White & Durkee

[57] ABSTRACT

With the trim connecting structure in accordance with the present invention, a quarter trim covering a quarter panel and the room inside of side sill comprises a trim body and a side scuff. The trim body is provided with a locking hole with different widths at the upper and lower ends, and the side scuff is provided with a locking claw having a notch so as to be elastically deformed inward in the width direction when the locking claw is inserted into the locking hole. The side scuff is locked into and fixed to the trim body by inserting the locking claw into the locking hole.

4 Claims, 6 Drawing Sheets

TRIM CONNECTING STRUCTURE

FIELD OF THE INVENTION AND RELATED ART STATEMENT

The present invention relates to a trim connecting structure covering the room inside of body panel of a motor vehicle.

Conventionally, trim having functions of room decoration, sound insulation, sound absorption, protection of functional parts, etc. is installed on the room inside of side body panel or the like of a motor vehicle, so that the room inside of side body panel is covered by the trim. The examples of conventional trim connecting structure are shown in FIGS. 7 through 10. A quarter trim 51, 61 is constructed by connecting a plate-shaped trim body 52, 62 disposed on the upper side of a not illustrated quarter panel to a side scuff 53, 63 disposed on the lower side of the quarter panel.

To connect the trim body 52, 62 to the side scuff 53, 63, a method which does not use a separate part such as a clip is employed. With the connecting structure for quarter trim 51 shown in FIGS. 7 and 8, a locking hole 54 of horizontally extending rectangle is formed in the trim body 52, and a claw 56 having a notch 55 projects from the upper bent portion 53a of the side scuff 53, so that the claw 56 is fixed by inserting it into the locking hole 54 while utilizing transverse "deflection" of the claw 56 and by engaging it with the trim body 52. With the connecting structure for quarter trim 61 shown in FIGS. 9 and 10, a locking hole 64 of T shape is formed in the trim body 62, a projecting member 65 is installed on the upper bent portion 63a of the side scuff 63, and a claw 66 formed by cutting the projecting member 65 is disposed on the inside of the projecting member 65, so that the claw 66 is fixed by inserting it into the locking hole 64 while utilizing vertical "deflection" of the claw 66 and by engaging it with the trim body 62.

However, with the above-described conventional connecting structures, only unidirectional "deflection" of claw 56, 66 is utilized when the claw 56, 66 of the side scuff 53, 63 is inserted. Therefore, the "engagement width" for the claw 56, 66 cannot be increased, so that high reliability cannot be attained in fixing the side scuff 53, 63 to the trim body 52, 62. Moreover, in the condition where the claw 56, 66 of the side scuff 53, 63 is inserted into the locking hole 54, 64 of the trim body 52, 62 and completely engaged, it is difficult and troublesome to remove the claw 56, 66 from the locking hole 54, 64, posing a problem in maintenance work.

OBJECT AND SUMMARY OF THE INVENTION

The present invention was made in view of the above situation. Accordingly, an object of the present invention is to provide a trim connecting structure in which a lower trim body can be readily installed to and removed from an upper trim body and can be reliably installed thereto, by which improved maintainability is assured.

To solve the problems with the above-described prior art, according to the present invention, the trim covering the room inside of a body panel comprises an upper trim body and a lower trim body, the upper trim body is provided with locking hole having different widths at the upper and lower ends, the lower trim body is provided with a claw having a notch so as to be elastically deformed inward in the width direction when the claw is inserted, and the lower trim body is locked into and fixed to the upper trim body by inserting the claw into the locking hole.

With the trim connecting structure in accordance with the present invention, the upper trim body is provided with a locking hole having different widths at the upper and lower ends, and the lower trim body is provided with a claw which can be elastically deformed inward in the width direction, so that the lower trim body is locked into and fixed to the upper trim body by inserting the claw into the locking hole. Therefore, deflections of the claw of lower trim body in the width direction and in the vertical direction can be utilized, and the claw can be inserted into the locking hole at the end with a larger width and can be moved to and locked into the end with a smaller width of the locking hole.

As described above, with the trim connecting structure in accordance with the present invention, the trim covering the room inside of a body panel comprises an upper trim body and a lower trim body, the upper trim body is provided with a locking hole having different widths at the upper and lower ends, the lower trim body is provided with a claw having a notch so as to be elastically deformed inward in the width direction when the claw is inserted, and the lower trim body is locked into and fixed to the upper trim body by inserting the claw into the locking hole. Therefore, deflections of the claw of the lower trim body in the width direction and the vertical direction can be utilized, so that the insertion force of the claw can be decreased and the lower trim body can be readily installed to and removed from the upper trim body, thereby the maintainability being assured. Further, the lower trim body can be reliably installed to the upper trim body in the connecting structure of the present invention since the engagement width of the claw of the lower trim body can be increased.

DETAILED DESCRIPTION OF PREFERRED EMBODIMENTS

Figure 1:
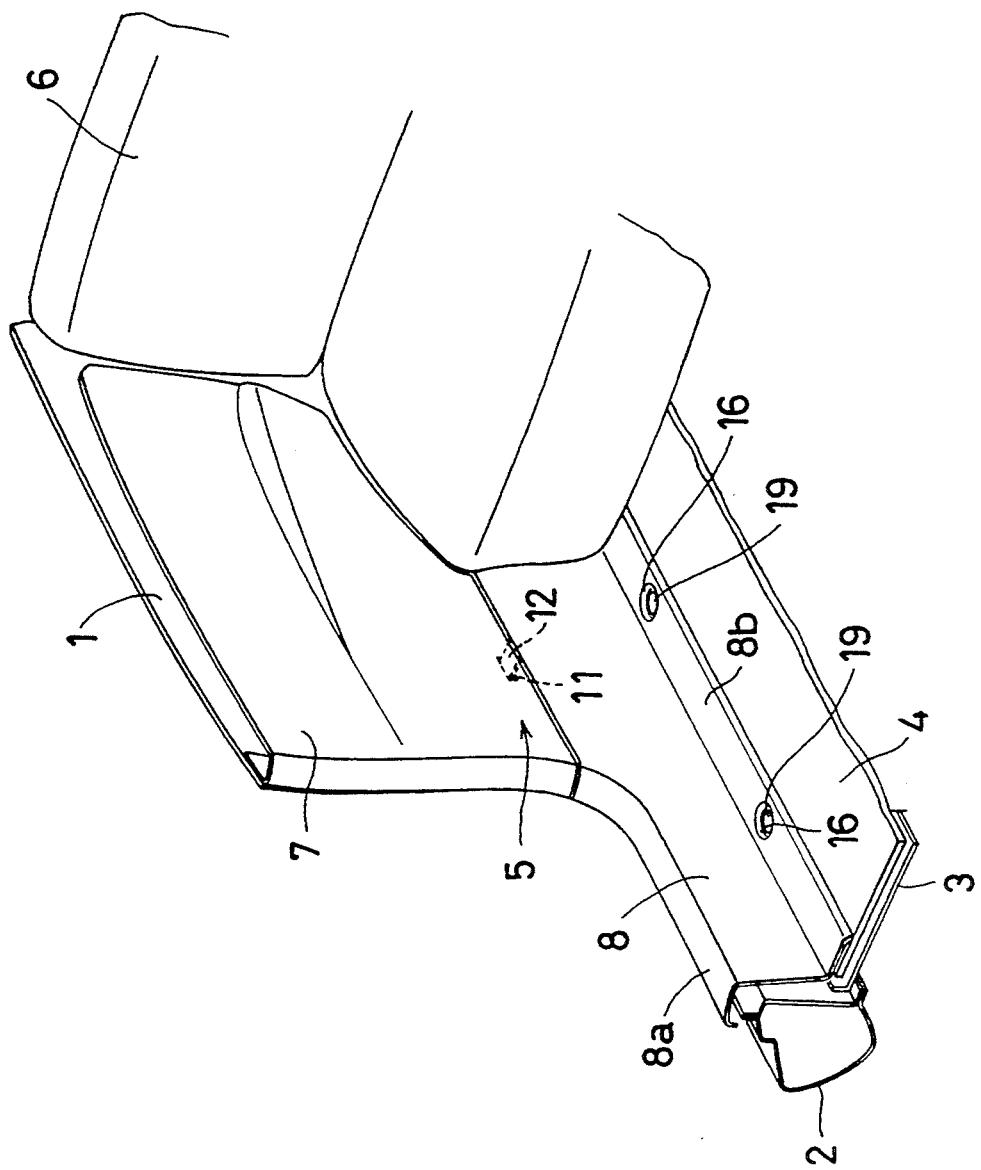
FIG. 1 is a perspective view schematically showing the room inside of a motor vehicle to which quarter trim is installed by applying a connecting structure in accordance with one embodiment of the present invention.

The present invention will be described in detail below with reference to the embodiment shown in the drawings.

FIGS. 1 through 6 show one embodiment of a trim connecting structure in accordance with the present invention. In the figure, reference numeral 1 denotes a quarter panel composing a side body panel of a motor vehicle, 2 denotes a side sill disposed in the longitudinal direction of the vehicle body, and 3 denotes a floor panel over which a carpet 4 is installed. The room inside of the quarter panel 1 and the side sill 2, and the end of carpet 4 are covered with a quarter trim 5. Incidentally, reference numeral 6 in FIG. 1 denotes a rear seat.

The aforesaid quarter trim 5 is composed by connecting a trim body (upper trim body) 7 disposed on the upper side of the quarter panel 1 and a side scuff (lower trim body) 8 disposed on the lower side of the quarter panel 1 with each other. Therefore, a bent portion 9, which is bent substantially at right angles toward the quarter panel 1, is formed at the lower portion of the trim body 7, and a fixing portion 10, which is bent substantially at right angles downward, is formed at the end of the bent portion 9.

Figure 2:
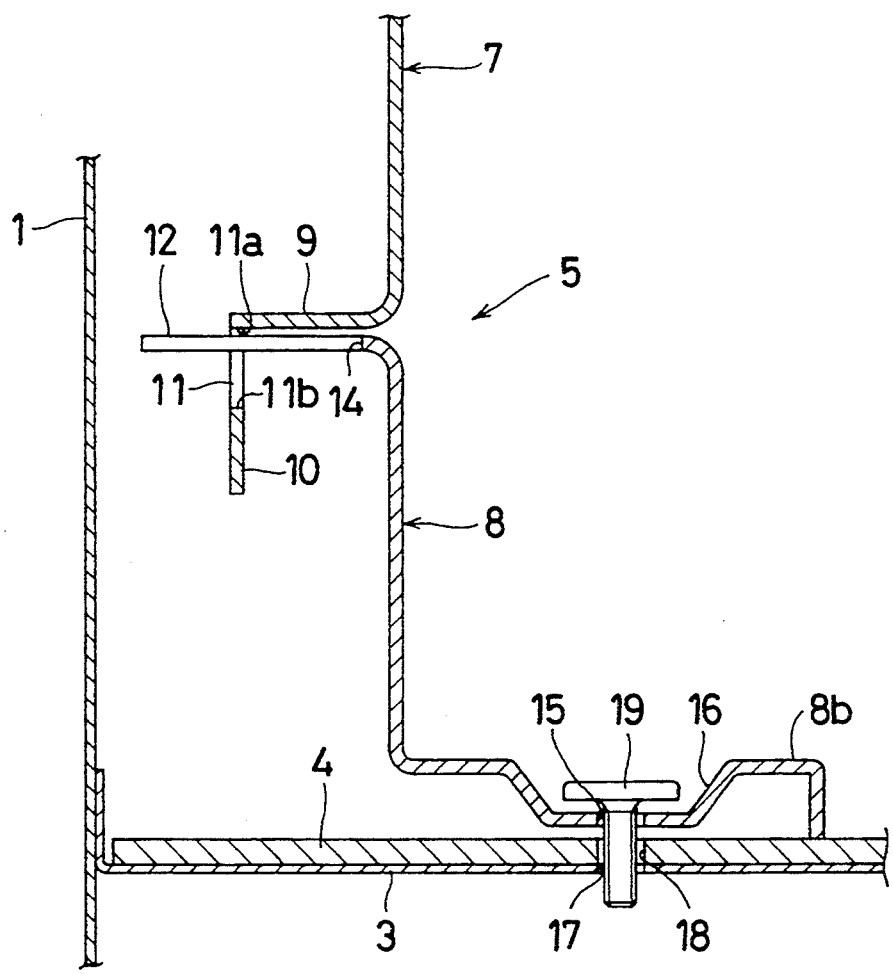
FIG. 2 is a sectional view showing the main portion of the aforesaid quarter trim.
Figure 3:
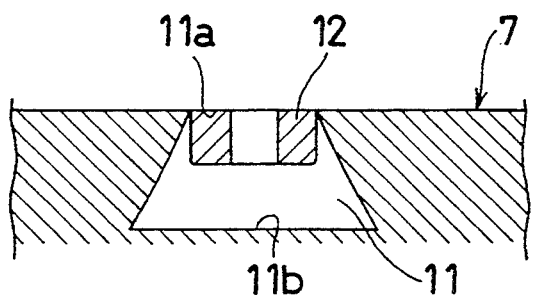
FIG. 3 is an expanded sectional view showing a condition in which a claw of side scuff locks into a locking hole in the trim body composing the aforesaid quarter trim.
Figure 4:
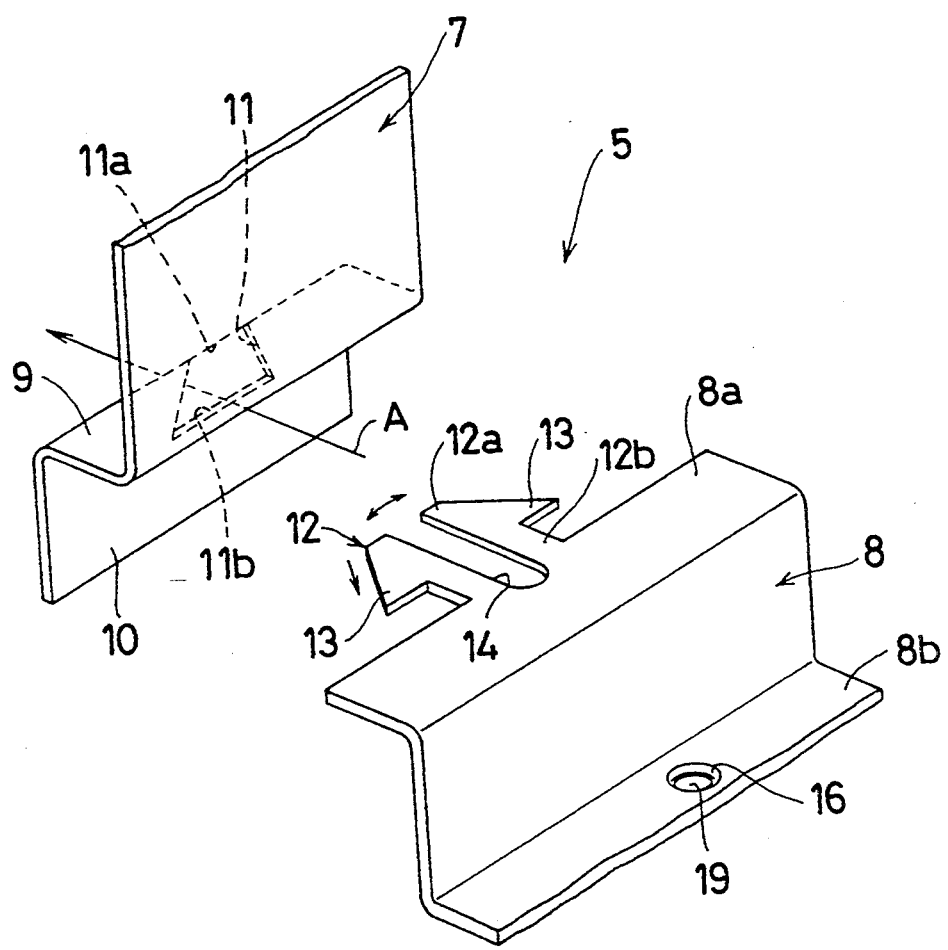
FIG. 4 is a perspective view showing the claw of side scuff inserted into the locking hole of the trim body.

At the upper part of the fixing portion 10, a locking hole 11 having different widths at the upper and lower ends is formed as shown in FIGS. 2 through 4. Specifically, the locking hole 11 is of a symmetrical trapezoidal shape with a smaller width of upper end 11a and a larger width of lower end 11b. Over the locking hole 11, the bent portion 9 is disposed so as to be in parallel to a claw (described later) of the side scuff 8 inserted into the locking hole 11. Therefore, the locking hole 11 is invisible from the outside of the room inside owing to the bent portion 9 located over the locking hole 11.

Figure 5:
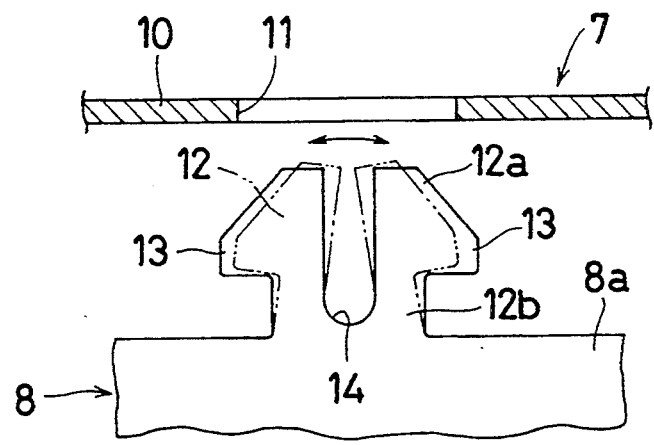
FIG. 5 is a plan view showing a condition in which the claw of the side scuff is deflected in the width direction.
Figure 6:
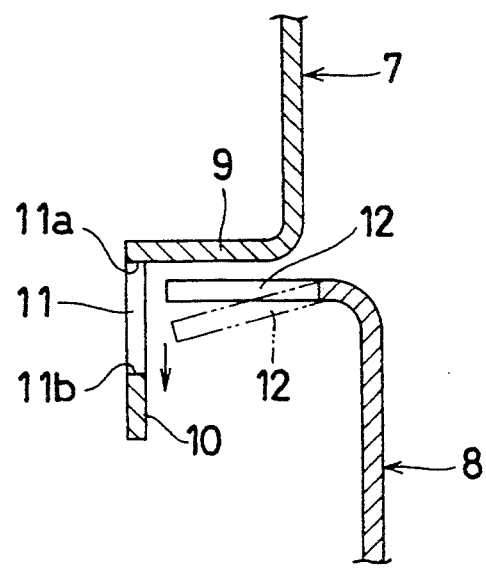
FIG. 6 is a sectional view showing a condition in which the claw of the side scuff is deflected vertically.
Figure 7:
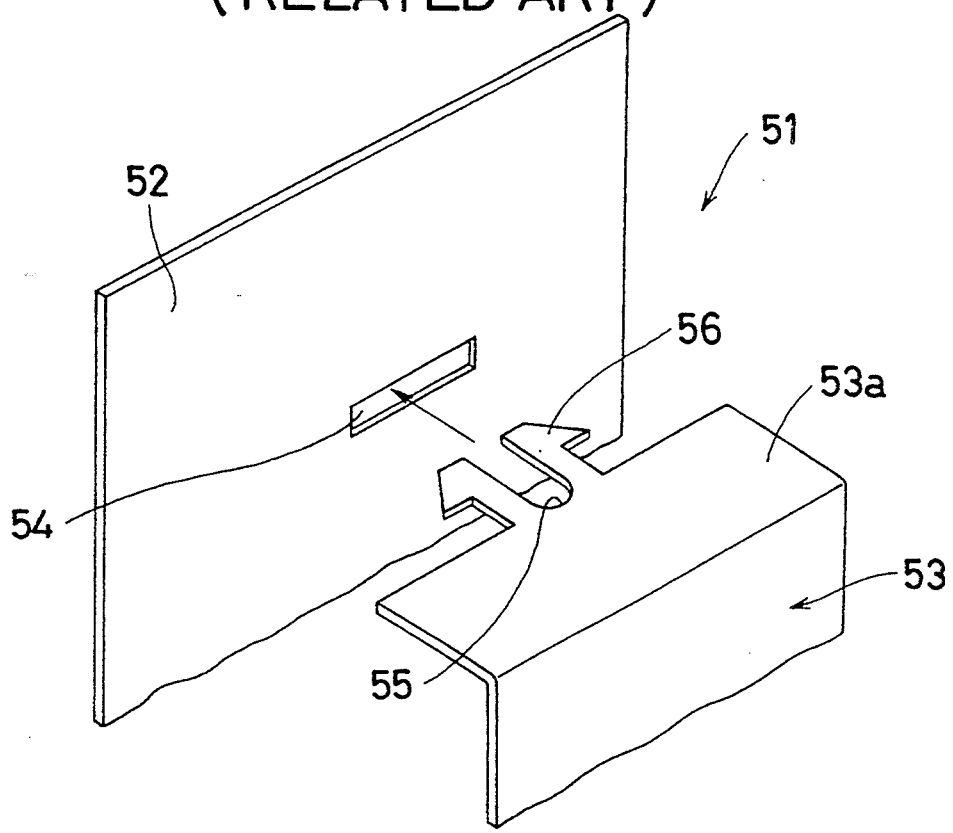
FIG. 7 is a perspective view showing the trim body of quarter trim and a side scuff connected by a conventional connecting structure.
Figure 8:
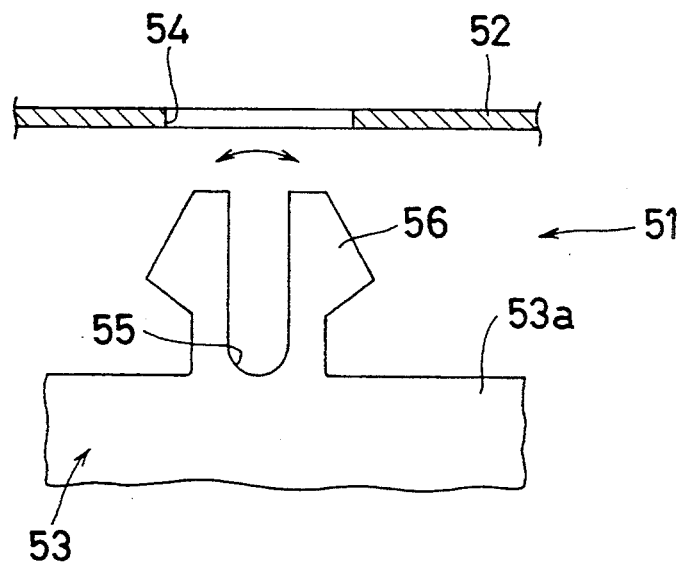
FIG. 8 is a plan view showing a condition in which a claw of side scuff shown in FIG. 7 is deflected in the width direction.
Figure 9:
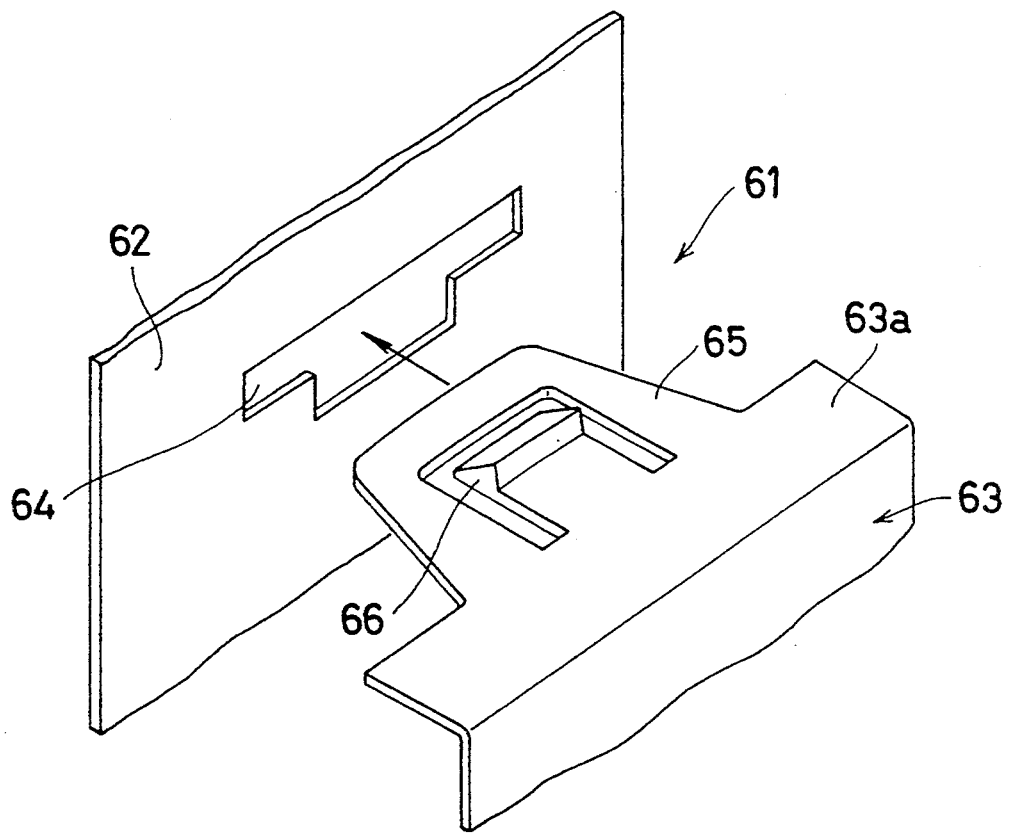
FIG. 9 is a perspective view showing the trim body of quarter trim and a side scuff connected by another conventional connecting structure.
Figure 10:
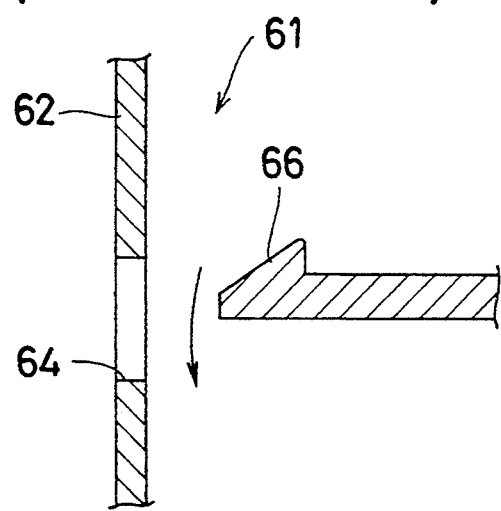
FIG. 10 is a sectional view showing a condition in which a claw of side scuff shown in FIG. 9 is deflected vertically.

The upper end portion 8a of the side scuff 8 is bent substantially at right angles toward the quarter panel 1 as shown in FIGS. 1 and 2, and a locking claw 12 projecting toward the quarter panel is integrally installed at a part of the end of the upper end portion 8a. The locking claw 12 is so formed as to be substantially of a shape of the feathers of an arrow in a plan view which is cut in parallel to the upper end portion 8a at the end as shown in FIGS. 4 and 5. Claws 13 expanding outward are installed at both sides of the tip end portion 12a, and the base end portion 12b is formed in a narrow form. At the central position of the locking claw 12, a notch 14 is formed from the tip end portion 12a to the base end portion 12b.

The lower end portion 8b of the side scuff 8 is bent substantially at right angles toward the room inside in the opposite direction from the upper end portion 8a. On the upper surface of the lower end portion 8b, a plurality of concave portions 16 having a clip hole 15 are disposed at intervals longitudinally with respect to the vehicle body. The clip hole 15 is disposed at a position corresponding to an attaching hole 17 of the floor panel 3 and an insertion hole 18 of the carpet 4, so that the lower end portion 8b of the side scuff 8 is fixed to the floor panel 3 together with the carpet 4 by inserting a clip 19 into the clip hole 15, the insertion hole 18, and the attaching hole 17.

In order to connect the quarter trim 5 of this embodiment, the trim body 7 is first arranged and installed on the upper side of the quarter panel 1. Then, the side scuff 8 is held by hands as shown in FIG. 4 to insert the locking claw 12 into the lower end 11b of the locking hole 11 of the trim body 7 in the arrow A direction. Next, the side scuff 8 is raised to move the locking claw 12 to the upper end 11a side of the locking hole 11. The upper end portion 8a of the side scuff 8 is fixed to the fixing portion 10 of the trim body 7 by engaging the claw 13 of the locking claw 12 with the peripheral portion of the locking hole 11. After that, the clip 19 is inserted into the attaching hole 17 of the floor panel 3 via the clip hole 15 and the insertion hole 18 of the carpet 4 to fix the lower end portion 8b of the side scuff 8 to the floor panel 3. Thus, the trim body 7 and the side scuff 8 are connected in such a manner as to be flush with each other (refer to FIGS. 1 and 2).

In order to release the connection between the trim body 7 and the side scuff 8 in servicing the vehicle body or the like, the clip 19 is first removed from the holes 17, 18, and 15 to take off the lower end portion 8b of the side scuff 8 from the floor panel 3. Then, the side scuff 8 is held by hands and the upper end portion 8a thereof is pushed down so that the locking claw 12 is moved to the lower end 11b side of the locking hole 11. The locking claw 12 is withdrawn from the locking hole 11 while releasing the engagement of the claw 13 of the locking claw 12 with the peripheral portion of the locking hole 11. Thus, the side scuff 8 is removed from the trim body 7.

With the connecting structure of this embodiment, the fixing portion 10 of the trim body 7 is provided with the locking hole 11 of a symmetrical trapezoidal shape with a smaller width of the upper end 11a and a larger width of the lower end 11b, whereas the upper end portion 8a of the side scuff 8 is provided with the claw 13 and the locking claw 12 in which the notch 14 is formed. Therefore, deflections of the locking claw 12 in the width direction and the vertical direction can be utilized. Further, if the insertion and withdrawal of the locking claw 12 are performed on the lower end 11b side of the locking hole 11 and the engagement of the claw 13 is performed on the upper end 11a side of the locking hole 11, the insertion force of the locking claw 12 can be decreased, and the engagement width of the claw 13 can be increased. Therefore, the side scuff 8 can be easily installed to and removed from the trim body 7, and the upper end portion 8a of the side scuff 8 can be reliably installed to the fixing portion 10 of the trim body 7.

Although the invention has been described with reference to one embodiment, the present invention is not limited to the above-described embodiment, and various changes and variations can be made on the basis of the technical concept of the present invention.

For example, although the connecting structure of the present invention has been applied to the quarter trim 5 in the above-described embodiment, it can be applied to other trim installed in the room inside of a motor vehicle. Also, although the locking hole 11 has been formed into a symmetrical trapezoidal shape in the above-described embodiment, the locking hole 11 may be formed into any shape which has different widths at the upper and lower ends and can reliably fix the locking claw 12.

I claim:

1. A trim connecting structure in which trim covering the room inside of a body panel comprises an upper trim body and a lower trim body, said upper trim body is provided with a symmetrical trapezoidal locking hole having edges and narrow and wide ends, said lower trim body is provided with a claw having edges and a notch so as to be elastically deformed inwardly in the width direction when said claw is inserted in said locking hole such that the edges of said claw engage the edges of said locking hole, and said lower trim body is locked into and fixed to said upper trim body by inserting said claw into said locking hole, said claw edge being tapered, such that the edges of said locking hole and claw coact to guide the claw towards entry into said locking hole at the wide end of said locking hole.

2. A trim connecting structure according to claim 1 wherein said claw of lower trim body is positioned at the narrow end of said locking hole of upper trim body in the normal condition after the insertion.

3. A trim connecting structure according to claim 1 wherein above said locking hole, said upper trim body is provided with a bent portion formed in parallel to said claw of lower trim body inserted into said locking hole.

4. A trim connecting structure according to claim 1 wherein said upper trim body and lower trim body are quarter trim components of motor vehicle.

* * * * *